(12) United States Patent
Rosser

(10) Patent No.: US 8,542,163 B2
(45) Date of Patent: Sep. 24, 2013

(54) BISTABLE ELECTROWETTING PICTURE ELEMENT

(76) Inventor: Roy J Rosser, Princeton, NJ (US)

( * ) Notice: Subject to any disclaimer, the term of this patent is extended or adjusted under 35 U.S.C. 154(b) by 835 days.

(21) Appl. No.: 12/045,315

(22) Filed: Mar. 10, 2008

(65) Prior Publication Data

US 2008/0218444 A1 Sep. 11, 2008

Related U.S. Application Data

(60) Provisional application No. 60/893,669, filed on Mar. 8, 2007.

(51) Int. Cl.
*G09G 3/28* (2006.01)

(52) U.S. Cl.
USPC ............................................ 345/60; 345/107

(58) Field of Classification Search
USPC ................. 345/107, 60, 37, 41; 315/169.4
See application file for complete search history.

(56) References Cited

U.S. PATENT DOCUMENTS

| | | | | |
|---|---|---|---|---|
| 7,548,363 B2 * | 6/2009 | Hayes et al. | ............... | 359/276 |
| 7,561,131 B2 * | 7/2009 | Ijzerman et al. | ............... | 345/87 |
| 2005/0104804 A1 | 5/2005 | Feenstra | | |
| 2005/0123243 A1 | 6/2005 | Steckl | | |
| 2005/0213014 A1 | 9/2005 | Feenstra | | |
| 2005/0270672 A1 | 12/2005 | Feenstra | | |
| 2006/0132404 A1 | 6/2006 | Hayes | | |
| 2007/0031097 A1 | 2/2007 | Heikenfeld | | |
| 2008/0074383 A1 * | 3/2008 | Dean | ............... | 345/156 |
| 2008/0297880 A1 * | 12/2008 | Steckl et al. | ............... | 359/291 |

\* cited by examiner

*Primary Examiner* — Kevin M Nguyen
*Assistant Examiner* — Kenneth B Lee, Jr.

(57) ABSTRACT

A bistable electrowetting picture element that has both stable "On" and "Off" states in which no power is consumed, and a switching voltage threshold. Displays using such picture elements may be either passive or active matrix addressed. A picture element contains two immiscible, fluids within a space between two surfaces. One of the fluids is an electro-conductive, polar liquid, such as to water. The other fluid is a non-polar liquid such as silicone oil. The picture element is electrically switchable between two states, both of which are maintained without a voltage being applied. In one state the light absorbing, non-polar liquid adjoins a region of one of the surfaces, while in the second state it adjoins another region on the other surface. The region adjoined to in the second state differs in area from the region adjoined to in the first state, thereby providing "On" and "Off" states.

14 Claims, 7 Drawing Sheets

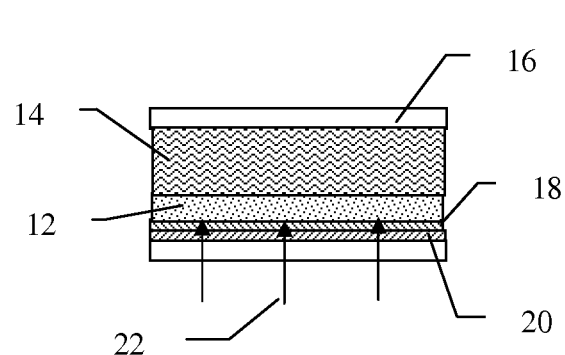
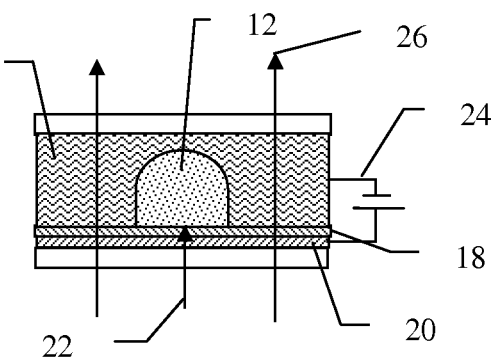
FIG. 1 A     10     FIG. 1 B
PRIOR ART
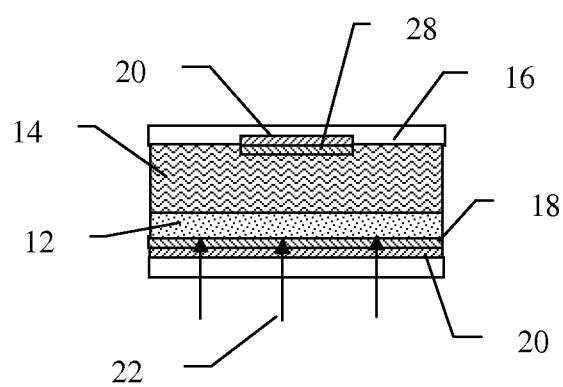
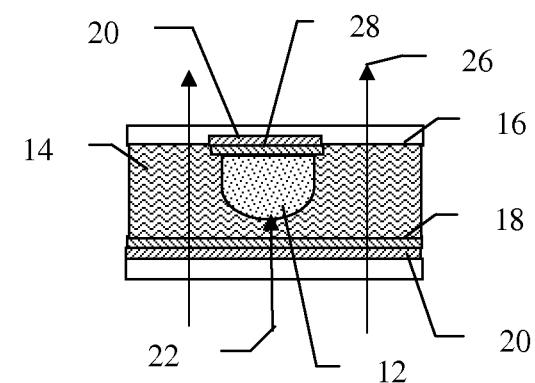
FIG. 2 A     30     FIG. 2 B

BISTABLE ELECTROWETTING PICTURE ELEMENT

CROSS REFERENCE TO RELATED APPLICATIONS

This application is related to, and claims priority from, U.S. Provisional Patent application No. 60/893,669 filed on Mar. 8, 2007 by R. Rosser, the contents of which are hereby incorporated by reference. This application is also related to U.S. Provisional Patent applications No. 60/894,210 filed on Mar. 10, 2007, No. 60/908,103 filed on Mar. 26, 2007, No. 60/939,061 filed on May 19, 2007, No. 60/943,752 filed on Jun. 13, 2007 and No. 61/016,750 filed on Dec. 26, 2007, the contents of all of which are hereby incorporated by reference in their entirety.

FIELD OF THE INVENTION

The present invention relates to the field of electrowetting displays. More specifically, the present invention relates to a method, apparatus, and system for bistable, electrowetting picture elements and displays.

BACKGROUND OF THE INVENTION

In the $20 billion mobile display market, the dominant display technology is liquid crystal (LCD) technology. This dominance may be measured by the fact that in 2006, of the 1 billion plus displays that were shipped for mobile devices, such as cellular phones, over 95% used LCD technology.

Despite their present dominance, LCD displays have the drawback of requiring back-lighting that can be very power consuming. This is of particular concern in battery operated, mobile devices such as cellular phones. In a typical cellular phone, back-lighting consumes about 80% of the battery power required to operate the phone.

Because of this drawback, there is considerable interest in alternative display technologies, particularly reflective display technologies that make use of ambient light rather than requiring backlighting. One alternative, reflective display technology that has received considerable attention is electrowetting display technology.

Electrowetting display technology uses the well-known electrowetting effect, in which the wetting properties of a surface can be altered by applying a voltage, to manipulate a colored oil from covering an entire picture element to beading up to cover only a small fraction of the picture element. When the oil covers the entire picture element, all the light is absorbed by the dye coloring the oil and the picture element is in an "Off" state. When the oil covers only a portion of the picture element, light can be transmitted—or reflected—by the picture element and it is in an "On" state. Reflective electrowetting displays may be made in which no light is reflected in the "Off" state and about 65% of the incident light is reflected in the "On" state. This compares to paper in which white paper reflects about 70% of the incident light, while black ink reflects almost none.

Electrowetting display technology has been described in detail in, for instance, US Patent publications no. 20050270672 by Feenstra et al. (Dec. 8, 2005), no. 20050213014 by Feenstra et al. (Sep. 29, 2005), no. 20050104804 by Feenstra et al. (May 19, 2005) no. 20060132404 by Hayes et al. (Jun. 22, 2006), no. 20050123243 Steckl et al. (Jun. 9, 2005) no. 20070031097 by Heikenfeld et al. (Feb. 8, 2007) the contents of all of which are hereby incorporated by reference.

FIGS. 1A and 1B show various components of an exemplary embodiment of prior art electrowetting display technology. A prior art, electrowetting picture element 10 typically has two immiscible fluids contained between an upper, hydrophilic surface 16 and a lower, hydrophobic surface 18. The immiscible fluids are typically a non-polar liquid 12, such as oil, and a polar liquid 14, such as water. The non-polar liquid 12 typically has added dyes or pigments to facilitate absorbing some, or all, of the incident light.

In an "Off" state, shown in FIG. 1A, the non-polar liquid 12 completely covers the hydrophobic surface 18 of the electrowetting picture element 10. In this "Off" state, incident light 22 is absorbed by the non-polar liquid 12 and any added dyes or pigments it may contain.

An "On" state of the prior art, electrowetting picture element 10 is achieved by applying a suitable voltage 24 between a transparent electrode 20 and the polar liquid 14. The transparent electrode 20 is electrically isolated from the polar liquid 14 by the hydrophobic surface 18 that is also a dielectric. The polar liquid 14 may have additives such as, but not limited to, acids, alkalis or salts or a combination thereof, to make the polar liquid 14 more conductive to electricity. The application of a suitable voltage 24 to such an arrangement results in the well-know electrowetting phenomenon in which the surface 18 becomes less hydrophobic. As surface 18 becomes less hydrophobic, the non-polar liquid 12 beads up, allowing the polar liquid 14 to come into contact with surface 18. As a result, some of the incident light 22 is no longer blocked by the non-polar liquid 12 and now emerges from the prior art, electrowetting picture element 10 as emergent light 26.

A significant draw back of the prior art, electrowetting picture element elements 10 are that they require a small, but continuous, voltage to be applied to maintain an "On" state. This means that when they are displaying an image, they are consuming power.

For many applications, including e-books, e-signage and mobile device displays, it is desirable to have both an "On" state as well as an "Off" state that require no power. Such a display element is typically termed a "bistable" display element.

SUMMARY OF THE INVENTION

The present invention relates to a bistable electrowetting picture element that may be suitable for use in a display. The bistable, electrowetting picture element of this invention has both a stable "On" state and a stable "Off" state in which no power is consumed. In addition, the bistable, electrowetting picture element of this invention has a switching voltage threshold. As a result a display made of the electrowetting picture elements of this invention may be operated using either passive matrix addressing or active matrix addressing.

In a preferred embodiment, the bistable, electrowetting picture element contains two fluids that are immiscible with each other. The immiscible fluids are contained within a space between two surfaces that confront each other. One of the fluids is an electroconductive or polar liquid such as, but not limited to water. The other fluid is a non-polar liquid such as, but not limited to, oil or silicone oil that may also contain light absorbing dyes and pigments.

The picture element is electrically switchable between two states, both of which are maintainable without a voltage being applied. In one state the fluid that is a non-polar liquid adjoins a region of one of the surfaces, while in the second state, the fluid that is a non-polar liquid adjoins another region on the other surface. The region adjoined to in the second state differs in area from the region adjoined to in the first state. The amount of light absorbed by the picture element is proportional to the size of the region to which the light absorbing, non-polar liquid is adjoined. If, in the first state, the region corresponds to the entire area of the picture element, no light will be transmitted and the picture element will be in an "Off" state. If in the second state the region corresponds to some fraction of the area of the picture element, some light will be transmitted and the picture element will be in an "On" state.

These and other features of the invention will be more fully understood by references to the following drawings.

BRIEF DESCRIPTION OF THE DRAWINGS

FIG. 1A is a schematic cross-section of an exemplary embodiment of a prior art electrowetting picture element in an "Off" state.

FIG. 1B is a schematic cross-section of an exemplary embodiment of a prior art electrowetting picture element in an "On" state.

FIG. 2A is a schematic cross-section of an exemplary transmission mode bistable, electrowetting picture element of the present invention in an "Off" state.

FIG. 2B is a schematic cross-section of an exemplary transmission mode bistable, electrowetting picture element of the present invention in an "On" state.

DETAILED DESCRIPTION

Figure 3:
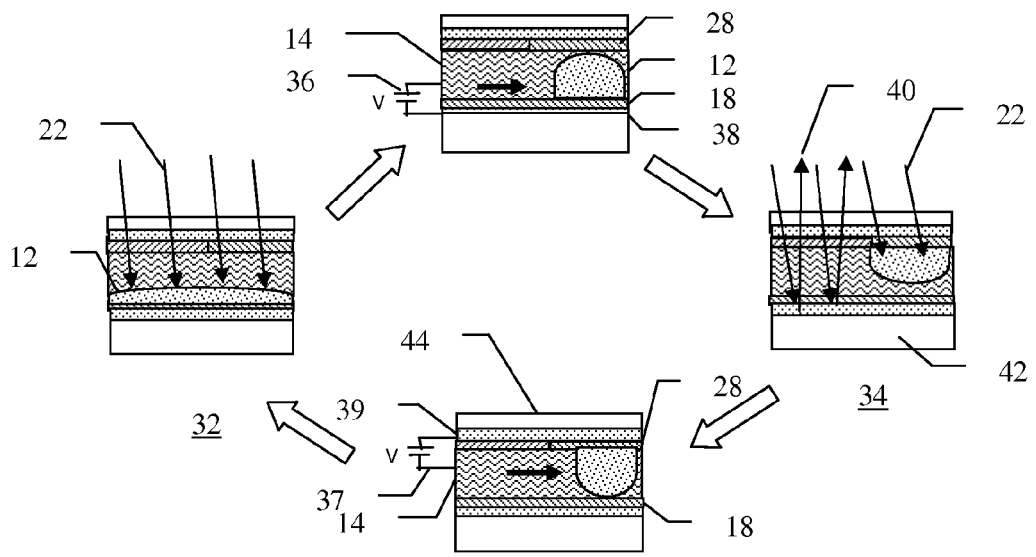
FIG. 3 is a schematic cross-sectional view of an exemplary reflection mode, bistable, electrowetting picture element transitioning from an "Off" state to an "On" state and back again.

The present invention is innovative over the prior art in providing a simple but novel, bistable electrowetting display technology. To understand the inventive concepts of the present invention it is useful to consider the accompanying drawings in which, as far as possible, like numbers represent like elements.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

FIGS. 2A and 2B shows various components of an exemplary bistable, electrowetting display picture element 30 that can be utilized to implement the inventive concepts described herein. The bistable, electrowetting display picture element 30 includes two immiscible fluids contained between an upper, hydrophilic surface 16 and a lower, hydrophobic surface 18. In addition, the bistable, electrowetting display picture element 30 includes a second, hydrophobic region 28 that may cover part of the hydrophilic surface 16. The immiscible fluids may, for instance be a non-polar liquid 12, such as oil, and a polar liquid 14 such as water. The non-polar liquid 12 may contain dyes or pigments to facilitate light absorption. The polar liquid 14 may contain salts, acids or alkalis to enhance the electrical conductivity of the liquid. The polar liquid 14 may also, or instead, contain additives such as, but not limited to, glycerol or alcohol, or some combination thereof, to allow the device to operate over more extended temperature ranges.

In an "Off" state of the bistable, electrowetting display picture element 30, shown in FIG. 2A, the non-polar liquid 12 is in contact with the lower hydrophobic surface 18 and covers the entire lower surface 18. In the "Off" state, incident light 22 is absorbed by the non-polar liquid 12 over the entire bistable, electrowetting display picture element 30.

In an "On" state of the bistable, electrowetting display picture element 30, shown in FIG. 2B, the non-polar liquid 12 is attached to the hydrophobic region 28 covering part of the hydrophilic surface 16. As the hydrophobic region 28, and, therefore, the attached non-polar liquid 12, does not cover the entire hydrophilic surface 16, some of the incident light 22 now emerges as emergent light 26.

The bistable, electrowetting display picture element 30 transitions from the "Off" state to the "On" state through the application of a voltage between the transparent electrode 20 under the hydrophobic surface 18 and the polar liquid 14. Application of such a voltage results in the well-known electrowetting effect in which the lower surface 18 becomes less hydrophobic, and more hydrophilic. This electrically induced change in the wetting properties of the lower surface 18 results in the non-polar liquid 12 beading up. If the applied voltage is above a predetermined threshold value, i.e., the voltage is of sufficient strength and duration, the non-polar liquid 12 beads up sufficiently to touch the hydrophobic region 28 covering the, upper hydrophilic surface 16. Once the non-polar liquid 12 touches the upper, hydrophobic region 28, it transitions there. Having transitioned to the upper hydrophobic region 28, the non-polar liquid 12 spreads out to cover the entire upper, hydrophobic region 28. The non-polar liquid 12 is, therefore, no longer in contact with the lower surface 18. The non-polar liquid 12, therefore, remains in an "On" state, attached to the upper hydrophobic region 28, even when no further voltage is applied between the lower transparent electrode 20 and the polar liquid 14.

The bistable, electrowetting display picture element 30 may be made to transition back from the "On" state shown in FIG. 2B to the "Off" state shown in FIG. 2A by the application of a suitable voltage between the upper, transparent electrode 20 under the hydrophobic region 28 and the polar liquid 14. Application of such a voltage that is above a predetermined threshold, now results in the well-known electrowetting effect changing the wetting properties of the surface in region 28. The surface in region 28 becomes less hydrophobic and more hydrophilic, resulting in the non-polar liquid 12 beading up. If the applied voltage is above a predetermined threshold, i.e. the voltage is of sufficient strength and duration, the non-polar liquid 12 beads up and touches the lower, hydrophobic surface 18. Once the non-polar liquid 12 touches the lower, hydrophobic surface 18 it transitions to that surface and spreads out over it. Once spread out over the lower surface 18, the non-polar liquid 12 no longer touches the upper region 28. The non-polar liquid 12, therefore, remains in the "Off" state, attached to the lower surface 18 even when no further voltage is applied between the upper transparent electrode 20 and the polar liquid 14.

FIG. 3 is a schematic cross-sectional view of an exemplary reflection mode, bistable, picture element transitioning from an "Off" state 32 to an "On" state 34 and back again.

In the "Off" state 32, the incident light 22 is partially or completely absorbed by the non-polar liquid 12 and any added dyes or pigments it may contain.

The reflection mode, bistable, picture element may be made to transition from the "Off" state 32 to the "On" state 34 by applying a suitable "On" switching voltage 36 between the polar liquid 14 and a lower, transparent electrode 38. The "On" switching voltage 36 causes the wetting properties of the lower surface 18 to change from hydrophobic to more hydrophilic, and the non-polar liquid 12 to bead up. The threshold value of the suitable voltage 36 depends on the thickness of the hydrophobic surface 18, the type and amount of non-polar liquid 12 and the distance between the lower, hydrophobic surface 18 and the upper hydrophobic region 28. For a hydrophobic surface 18 having a thickness of approximately 1 μm, a non-polar liquid 12 that is an oil having a thickness of approximately 10 μm and a distance between the lower, hydrophobic surface 18 and the upper hydrophobic region 28 of about 100 μm, a suitable threshold voltage may, for instance, be in the range of 10 to 30 volts. That is, the application of a voltage that is greater than or equal to the threshold voltage to such a configuration will cause the non-polar liquid 12 that was covering the lower surface 18 to bead up sufficiently to touch the hydrophobic region 28. The voltage 36 would need to be applied for a long enough time period for the non-polar liquid 12 to transition completely from one surface to the other, typically for a time in the range of 5 milliseconds to 50 milliseconds.

In one embodiment, the polar liquid 14 may be steered toward the hydrophobic region 28 by having a gap in the lower, transparent electrode 38 that corresponds to the location of the hydrophobic region 28. In this way, the electric field set up by the applied voltage 36 will not change the wetting properties of the lower hydrophobic surface 18 in this vicinity as much as it does on the rest of the surface 18. This results in the non-polar liquid 12 being steered toward this region, and, therefore, being positioned opposite the upper, hydrophobic region 28 as the non-polar liquid 12 beads up.

In an alternative embodiment, the lower, hydrophobic surface 18 may be made thicker in a region corresponding to the location of the upper, hydrophobic region 28. As a result, the electric field set up by the applied voltage 36 will not change the wetting properties of the lower surface 18 in this vicinity as much it changes them on the rest of the surface 18. This, too, results in the non-polar liquid 12 being steered toward this region, and, therefore, being positioned opposite the upper, hydrophobic region 28 as the non-polar liquid 12 beads up.

In the "On" state 34, the non-polar liquid 12 remains confined to the hydrophobic region 28 even when the voltage 36 is no longer applied. Some of the incident light 22 is still absorbed by the non-polar liquid 12, but a fraction of the incident light 22 reaches the lower reflecting support 42 and is reflected back to emerge as reflected light 40. The ratio of reflected light 40 to incident light 22 is dependant, in part, on the ratio of the area of the upper, hydrophobic region 28 to the area of the entire picture element.

The reflection mode, bistable, picture element may be made to transition from the "On" state 34 to the "Off" state 32 by a suitable "Off" switching voltage 37 applied between the polar liquid 14 and an upper, transparent electrode 39, thereby changing the wetting characteristics of the region 28 from hydrophobic to more hydrophilic. As a result of the change in wetting properties of region 28, the non-polar liquid 12 that was attached to it will bead up. If the applied voltage is above an "Off" switching voltage threshold, the non-polar liquid 12 will bead up sufficiently to bridge the distance between the region 28 and the lower surface 18. Once the non-polar liquid 12 touches the hydrophilic lower surface 18 it will transition there. The threshold value of the "Off" switching voltage 37 depends on the thickness of the hydrophobic surface 18, the type and amount of non-polar liquid 12 and the distance between the upper, hydrophobic region 28 and the lower, hydrophobic surface 18. The voltage 36 would need to be applied for a long enough time period for the non-polar liquid 12 to transition completely from one surface to the other, typically for a time in the range of 5 milliseconds to 50 milliseconds.

Figure 4:
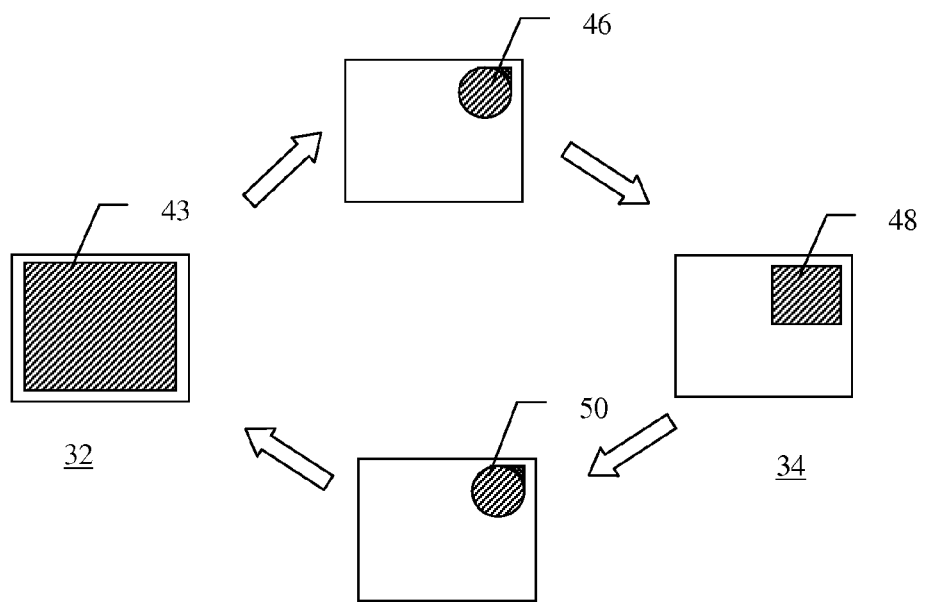
FIG. 4 is a schematic plan view of an exemplary bistable, electrowetting picture element transitioning from an "Off" state to an "On" state and back again.

FIG. 4 is a schematic plan view of an exemplary bistable, electrowetting picture element transitioning from an "Off" state 32 to an "On" state 34 and back again.

In the "Off" state 32, the non-polar liquid 12 is spread over the entire picture element surface 43. In the "Off" state 32, all incident light 22 may, therefore, be absorbed by the non-polar liquid 12 and any dyes or pigments it contains. Application of the suitable "On" switching voltage 36 between the polar liquid 14 and the lower, transparent electrode 38 results in the lower surface 18 becoming more hydrophilic and the non-polar liquid 12 beading up to occupy a small portion 46 of the picture element surface. When sufficiently beaded up, the non-polar liquid 12 touches the upper hydrophobic region 28 and transitions to that surface. The small portion 46 of the lower surface 18 occupied by the non-polar liquid 12 when it is beaded up sufficiently to reach the upper hydrophobic region 28 may be as little as 20% of the picture element area.

Once the non-polar liquid 12 transitions to the upper hydrophobic region 28, it spreads out and occupies the entire upper hydrophobic region 28, resulting in the stable "On" state 34 in which the non-polar liquid 12 only covers a portion 48 of the entire picture element. The portion 48 of the picture element covered by the non-polar liquid 12 in the "On" state 34 may be as little as 25% of the entire picture element.

Application of as suitable "Off" switching voltage 37 between the polar liquid 14 and the upper, transparent electrode 39 results in the upper region 28 becoming more hydrophilic and the non-polar liquid 12 beading up to occupy a smaller portion 50 of what was the upper hydrophobic region 28. If the applied voltage is above a predetermined "Off" switching threshold voltage 37, the non-polar liquid 12 will bead up sufficiently to touch the lower hydrophobic region 18, and then transition to that surface. The smaller portion 50 of the upper region 28 may be as little as 20% of the picture element area when the non-polar liquid 12 is sufficiently beaded up to touch and make the transition to the lower hydrophobic region 18.

Once the non-polar liquid 12 transitions to the lower hydrophobic region 18, it spreads out and occupies the entire lower hydrophobic region 18, resulting in the stable "Off" state 32 in which the non-polar liquid 12 covers the entire picture element.

Figure 5:
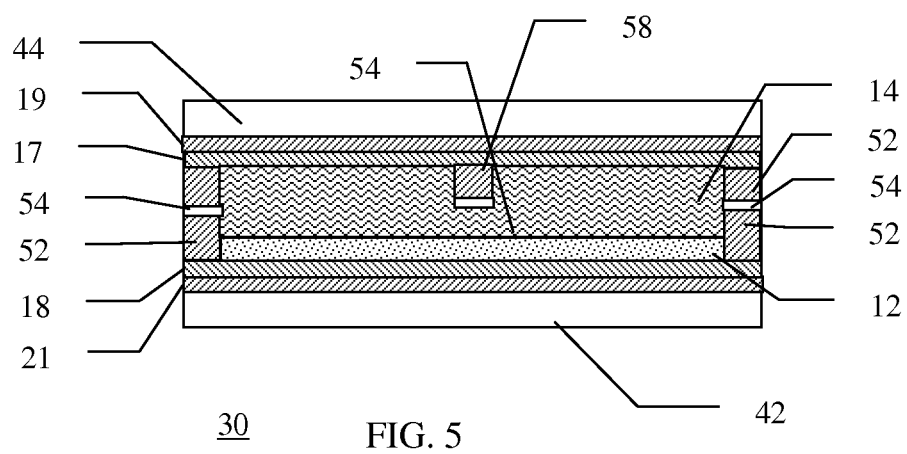
FIG. 5 is a schematic cross-section of a further exemplary bistable, electrowetting picture element of the present invention in an "Off" state.

FIG. 5 is a schematic cross-section of a further exemplary bistable, electrowetting picture element 30 of the present invention in an "Off" state.

The bistable, electrowetting display picture element 30 comprises a lower support plate 42 having a lower electrode 21 and a lower surface 18 that is hydrophobic. The area of a picture element is defined by a hydrophilic picture element defining barrier 52. The bistable, electrowetting display picture element 30 further comprises an upper support plate 44 that is typically transparent. The upper support plate 44 has an upper, transparent electrode 19, an upper surface 17 that is hydrophobic and a hydrophilic picture element defining barrier 52. The upper surface 17 may be divided into sub-picture regions 56 by a hydrophilic, sub-picture region dividing wall 58. An immiscible polar liquid 14 and non-polar liquid 12 are contained between the surface 18 of the lower support plate 42 and the surface 17 of the upper support plate 44.

The bistable, electrowetting display picture element 30 also comprises a common electrode 54 that may, for instance, be a thin metal coating, or thin metal foil, located on top of the hydrophilic, sub-picture region dividing wall 58, or sandwiched between the upper and lower hydrophilic picture element defining barrier 52, or some combination thereof.

In a preferred embodiment, the upper support plate 44 is a transparent sheet such as, but not limited to, a transparent plastic or glass. The lower support plate 42 may be a similar transparent sheet if the bistable, electrowetting display picture element 30 is used in transmission mode, or it may be a reflective or diffusive material such as, but not limited to, a suitable plastic or reflective coated plastic, glass or metal, if the bistable, electrowetting display picture element 30 is used in reflective mode. The upper, transparent electrode 19 may, for instance, be a thin indium tin oxide (ITO) coating, or a thin aluminum doped zinc oxide coating (ZAO), as is well known in the art. Similar, in a transmission mode bistable, electrowetting display picture element 30, the lower electrode 21 may also be a transparent electrode comprised of a thin indium tin oxide (ITO) coating, or a thin aluminum doped zinc oxide coating (ZAO). The common electrode 54 may also be such a transparent electrode.

The upper surface 17 and the lower surface 18 are both thin coatings that are both good dielectrics and hydrophobic. In a preferred embodiment, both the upper surface 17 and the lower surface 18 are comprised of an amorphous fluoropolymer such as, but not limited to, polytetrafluoroethylene (PTFE), perfluoroalkoxy polymer resin (PFA) or fluorinated ethylene-propylene (FEP) all of which are sold by DuPont Inc. of Delaware under the tradename Teflon™. The thickness of the amorphous fluoropolymer is typically in the range of 0.5 to 2 µm.

The non-polar liquid 12 may be an oil such as, but not limited to, silicone oil or an alkane such as, but not limited to, hexadecane. The oil or alkane may be colored with suitable, well-known dyes or pigments including, but not limited to, suitable organic dyes in order to absorb, partially or fully, one or more spectral regions of light.

The polar liquid 14 is electroconductive and may, for instance, be water or a salt solution such as a solution of KCl in a mixture of water and ethyl alcohol. To operate in temperature ranges from −45 degrees C. to 200 degrees C., the polar liquid 14 may comprise a mixture that includes glycerol and alcohol.

The non-polar liquid 12 and the polar liquid 14 may also be selected to be matched in density so as to make the bistable, electrowetting display picture element 30 robust to motion or vibration. For instance, 1-brom-dodecane has the same density as a solution of a few percent of $Na_2SO_4$ in water at room temperature.

In the "Off" state, the non-polar liquid 12 is in contact with the surface 18 that is hydrophobic. The non-polar liquid 12 is contained to the area of a picture element by a hydrophilic picture element defining barrier 52.

By applying a suitable voltage between the lower electrode 21 and the common electrode 54, the lower surface 18 may be made less hydrophobic, resulting in the non-polar liquid 12 beading up. With the right combination of amount of non-polar liquid 12, thickness of lower surface 18, separation of lower surface 18 from the upper surface 17 and a voltage above a predetermined threshold voltage value, the lower surface 18 may be made to bead up and touch upper surface 17. As the upper surface 17 has no voltage applied across it, it remains hydrophobic. The lower surface 18 in contrast is now made more hydrophilic by the applied voltage that elicits the well-known electrowetting effect. Once the non-polar liquid 12 touches the upper surface 17 it, therefore, transfers to that surface.

In the bistable, electrowetting display picture element 30 of FIG. 5 there is no need to steer the beading up non-polar liquid 12 in any particular direction, as each of the sub-picture regions 56 defined by the hydrophilic, sub-picture region dividing wall 58 are equal in area. Any beading up to the sufficient height will enable the non-polar liquid 12 to touch one of the sub-picture regions 56 and transition there.

Figure 6:
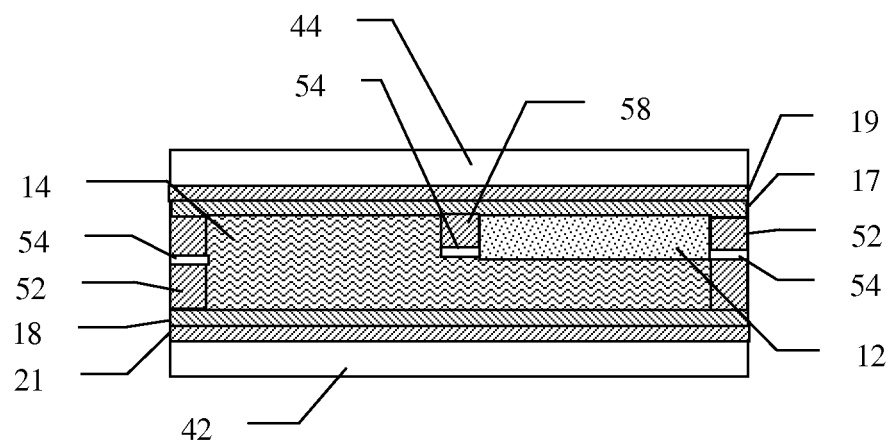
FIG. 6 is a schematic cross-section of a further exemplary bistable, electrowetting picture element of the present invention in an "On" state.

FIG. 6 is a schematic cross-section of a further exemplary bistable, electrowetting picture element 30 of the present invention in an "On" state. The non-polar liquid 12 has transferred to the upper surface 17 and spread out, but is contained by the hydrophilic, sub-picture region dividing wall 58 to occupy a sub-picture region 56.

For example, a 250 µm square picture element with an "Off" state non-polar liquid 12 thickness of 10 µm will bead up to a height of about 71 µm when it occupies 20% of the lower surface 18. This degree of beading up has been shown to occur with an applied voltage above a threshold voltage of about 25 Volts for about 20 msecs when the lower surface 18 is a 0.8 µm thick amorphous fluoropolymer. With a surface to surface separation in the range of 60 µm to 70 µm, the non-polar liquid 12 may touch the upper surface 17 when such a voltage is applied. Once the non-polar liquid 12 is on the upper surface 17 it will spread out to fill the sub-picture region 56 defined by the hydrophilic, sub-picture region dividing wall 58. If the sub-picture region 56 is 25% of the upper surface 17 area, the non-polar liquid 12 will now have a thickness of 40 μm and will allow 75% of any incident light 22 to be transmitted or reflected. The bistable, electrowetting display picture element 30 will remain in this "On" state indefinitely without any voltage being applied to either of the electrodes, and with no power being consumed.

By applying a suitable voltage between the upper, transparent electrode 19 and the common electrode 54, the upper surface 17 may be made less hydrophobic, resulting in the non-polar liquid 12 beading up. With the right combination of amount of non-polar liquid 12, thickness of upper surface 17, separation of lower surface 18 from the upper surface 17 and a voltage above a predetermined threshold voltage value, the non-polar liquid 12 on the upper surface 17 may be made to bead up and touch the lower surface 18. As the lower surface 18 has no voltage applied across it, it remains hydrophobic. The upper surface 17 in contrast is now made more hydrophilic by the applied voltage. Once the non-polar liquid 12 touches the lower surface 18 it, therefore, transfers to that surface, and spreads out to create a stable off-state, as shown in FIG. 5.

Figure 7A:
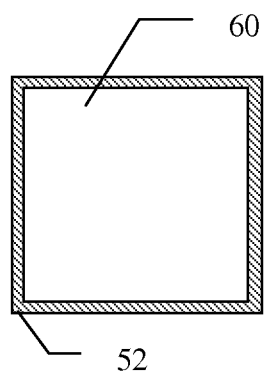
FIG. 7A shows a hydrophilic picture element defining barrier defining a single square picture element.

FIG. 7A shows a hydrophilic picture element defining barrier 52 defining a single square picture element 60. The hydrophilic picture element defining barrier 52 may, for instance, be a suitably etched polymer layer.

Figure 7B:
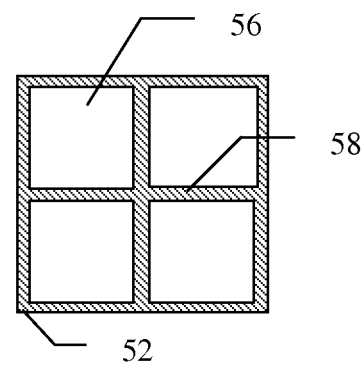
FIG. 7B shows a square picture element subdivided into four equal sub-picture regions.

FIG. 7B shows a square picture element, defined by a hydrophilic picture element defining barrier 52, subdivided into four equal sub-picture regions 56 by a hydrophilic, sub-picture region dividing wall 58. Each of the sub-picture regions 56 has an area that is approximately 25% of the area of the picture element 60. The hydrophilic, sub-picture region dividing wall 58 may also be a suitably etched polymer layer and may be higher than, lower than, or the same height as the hydrophilic picture element defining barrier 52.

Figure 7C:
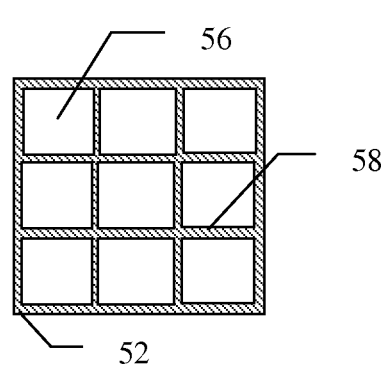
FIG. 7C shows a square picture element subdivided into nine equal sub-picture regions.

FIG. 7C shows a square picture element, defined by a hydrophilic picture element defining barrier 52, subdivided into nine equal sub-picture regions 56 by a hydrophilic, sub-picture region dividing wall 58. Each of the sub-picture regions 56 has an area that is approximately 11% of the area of the picture element 60.

Figure 7D:
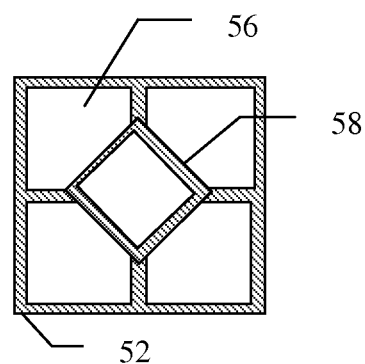
FIG. 7D shows a square picture element subdivided into five equal sub-picture regions.

FIG. 7D shows a square picture element, defined by a hydrophilic picture element defining barrier 52, subdivided into five equal sub-picture regions 56 by a hydrophilic, sub-picture region dividing wall 58. Each of the sub-picture regions 56 has an area that is approximately 20% of the area of the picture element 60 even though the sub-picture region 56 are not all congruent.

Figure 8A:
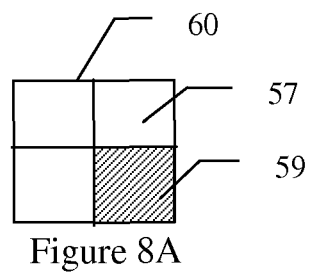
FIG. 8A shows a schematic plan view of a picture element that has four sub-picture regions in an "On" state.

FIG. 8A shows a schematic plan view of a picture element in an "On" state that has four sub-picture regions. The picture element 60 has three "On" sub-picture regions 57 and one "Off" sub-picture region 59. The picture element 60 of FIG. 8A has a hydrophilic, sub-picture region dividing wall 58 as shown in FIG. 7B. Such a hydrophilic, sub-picture region dividing wall 58 limits the non-polar, light absorbing, liquid 12 to the "Off" sub-picture region 59. As a result, approximately 75% of any incident light 22 is either transmitted, or reflected, by the picture element 60.

Figure 8B:
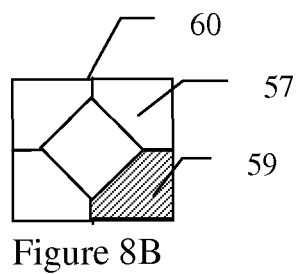
FIG. 8B shows a schematic plan view of a picture element that has five sub-picture regions in an "On" state.

FIG. 8B shows a schematic plan view of a picture element in an "On" state that has five sub-picture regions. The picture element 60 has four "On" sub-picture regions 57 and one "Off" sub-picture region 59. The picture element 60 of FIG. 8B has a hydrophilic, sub-picture region dividing wall 58 as shown in FIG. 7D. Such a hydrophilic, sub-picture region dividing wall 58 limits the non-polar, light absorbing, liquid 12 to the "Off" sub-picture region 59. As a result, approximately 80% of any incident light 22 is either transmitted, or reflected, by the picture element 60.

Figure 8C:
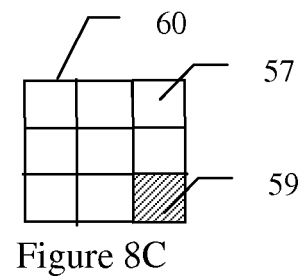
FIG. 8C shows a schematic plan view of a picture element that has nine sub-picture regions in an "On" state.

FIG. 8C shows a schematic plan view of a picture element in an "On" state that has nine sub-picture regions. The picture element 60 has eight "On" sub-picture regions 57 and one "Off" sub-picture region 59. The picture element 60 of FIG. 8B has a hydrophilic, sub-picture region dividing wall 58 as shown in FIG. 7C. Such a hydrophilic, sub-picture region dividing wall 58 limits the non-polar, light absorbing, liquid 12 to the "Off" sub-picture region 59. As a result, approximately 89% of any incident light 22 is either transmitted, or reflected, by the picture element 60.

Figure 9A:
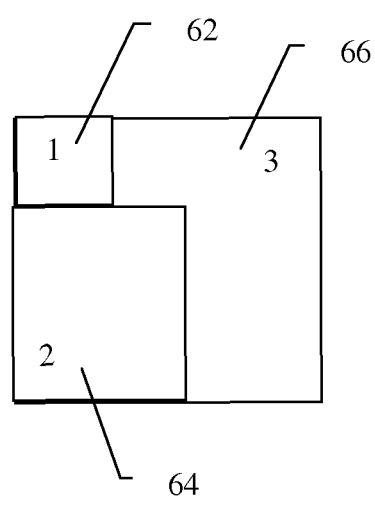
FIG. 9A shows a plan view of an exemplary picture element 60 divided into three regions of unequal area.

FIG. 9A shows a plan view of an exemplary picture element 60 divided into three regions of unequal area. The smallest region 62 may, for instance have an area that is in a range of 5% to 20% of the total area of the picture element 60. The mid-sized region 64 may, for instance have an area that is in a range of 15% to 40% of the total area of the picture element 60. The large region 66 may, for instance have an area that is in a range of 40% to 80% of the total area of the picture element 60. Such a picture element 60 is one way of achieving some degree of grey scale for the individual picture elements.

Figure 9B:
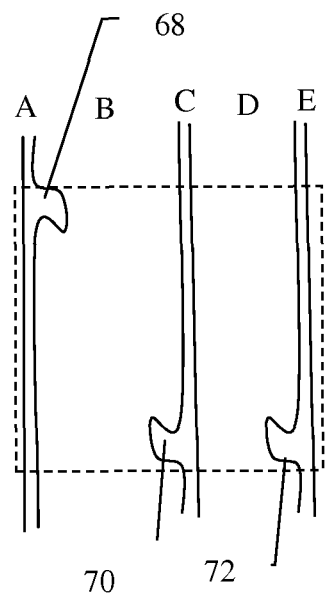
FIG. 9B shows a plan view of an exemplary structure of a lower electrode configured to drive the picture element of FIG. 9A.

FIG. 9B shows a plan view of an exemplary structure of the lower electrode 21 configured to drive the picture element of FIG. 9A. The lower electrode 21 for each picture element is divided into five regions, A, B, C, D, and E that may be addressed individually or in combination. Three of the regions are essentially narrow wires with a small island region. Electrode region A has a first, small island region 68. Electrode region C has a second, small island region 70. Electrode region E has a third, small island region 72.

When a voltage is applied to regions B, C, D and E, but not to A then the first, small island region 68 will be an area in which the electrowetting effect will be less than over the rest of the pixel. The non-polar liquid 12 will, therefore, be pushed toward the first, small island region 68 as it bead up, so that when sufficiently beaded up, the non-polar liquid 12 will touch the upper surface 17 within the smallest region 62 defined by the hydrophilic, sub-picture region dividing wall 58. The result will, in this example, be an "On" state in which 80% to 95% of the light is either transmitted or reflected by the picture element.

When a voltage is applied to regions A, B, D and E, but not to C then the second, small island region 70 will be an area in which the electrowetting effect will be less than over the rest of the pixel. The non-polar liquid 12 will, therefore, be pushed toward the second, small island region 70 as it beads up, so that when sufficiently beaded up, the non-polar liquid 12 will touch the upper surface 17 within the mid-sized region 64 defined by the hydrophilic, sub-picture region dividing wall 58. The result will, in this example, be an "On" state in which 60% to 85% of the light is either transmitted, or reflected, by the picture element.

When a voltage is applied to regions A, B, C and D, but not to E then the third, small island region 72 will be an area in which the electrowetting effect will be less than over the rest of the pixel. The non-polar liquid 12 will, therefore, be pushed toward the third, small island region 72 as it beads up, so that when sufficiently beaded up, the non-polar liquid 12 will touch the upper surface 17 within the large region 66 defined by the hydrophilic, sub-picture region dividing wall 58. The result will, in this example, be an "On" state in which 20% to 60% of the light is either transmitted or reflected by the picture element.

Figure 10:
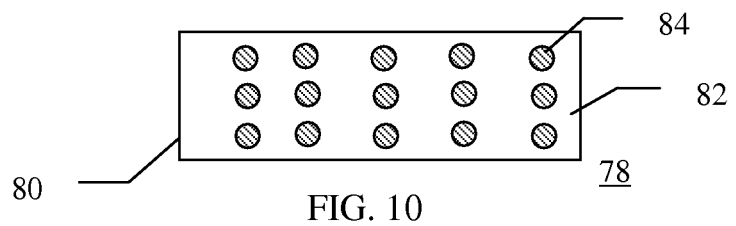
FIG. 10 shows a schematic plan view of a multi-region structure.

FIG. 10 shows a schematic plan view of a multi-region structure 78. The multi-region structure is a substrate 80 having a hydrophilic surface 82 in which there are a multiplicity of hydrophobic regions 84. The hydrophobic regions 84 may, for instance, be picture elements having a hydrophobic surface that is, for instance, an amorphous fluoropolymer.

Figure 11:
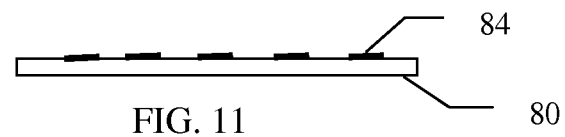
FIG. 11 shows a schematic cross-sectional view of the multi-region structure of FIG. 10.

FIG. 11 shows a schematic cross-sectional view of the multi-region structure 78.

Figure 12:
FIG. 12 shows a schematic cross-sectional view of the multi-region structure loaded with non-polar liquid.

FIG. 12 shows a schematic cross-sectional view of the multi-region structure loaded with non-polar liquid. Each of the hydrophobic regions 84 now has a droplet of non-polar liquid 86 loaded onto it. The non-polar liquid 86 may, for instance, be an oil, such as silicone oil. The non-polar liquid 86 droplets may all be of substantially the same volume and loaded by a technique such as dipping the multi-region structure 78 into a container of the non-polar liquid 86 and withdrawing the multi-region structure 78 at a controlled, even rate.

Figure 13:
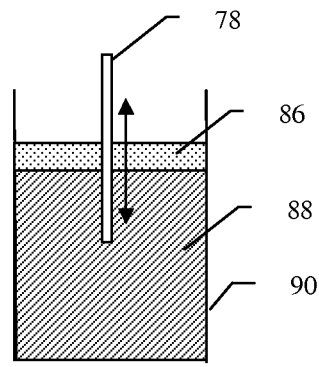
FIG. 13 shows a schematic cross-sectional view of an exemplary configuration for loading a multi-region structure with non-polar liquid.

FIG. 13 shows a schematic cross-sectional view of an exemplary configuration for loading a multi-region structure with non-polar liquid. The non-polar liquid 86 is floating in a thin layer on top of a higher density liquid 88. The higher density liquid 88, that may for instance be water, is contained in a container 90. The multi-region structure 78 is lowered into the container 90 through the layer of non-polar liquid 86 until all the hydrophobic regions 84 are submersed. The multi-region structure 78 is then withdrawn from the container 90 at a controlled, uniform rate. The result is that each of the hydrophobic regions 84 of the multi-region structure 78 is loaded with substantially the same amount of non-polar liquid 86. Such a process may, for instance, be a useful method of loading a multi-picture element display substrate with uniform amounts of colored silicone oil as part of the process of manufacturing a display.

Figure 14:
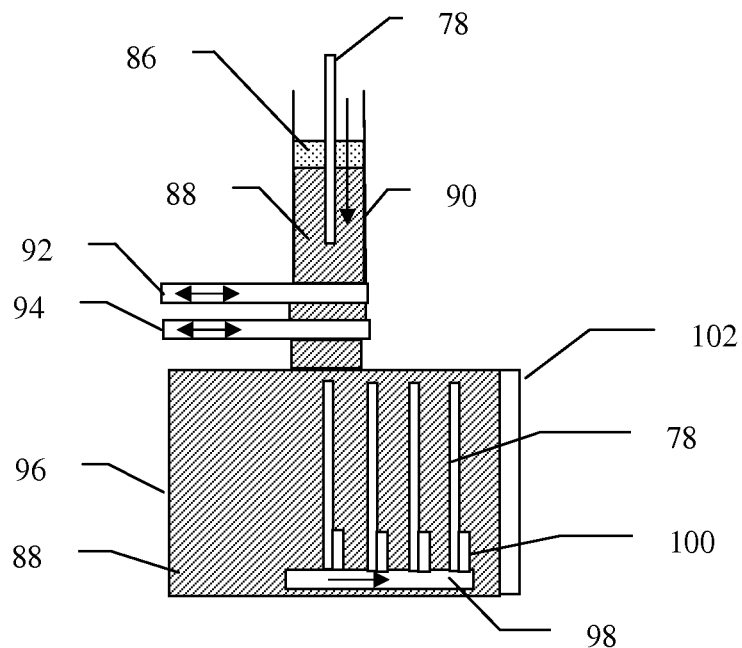
FIG. 14 shows a schematic cross-sectional view of a further exemplary configuration for loading a multi-region structure with non-polar liquid.

FIG. 14 shows a schematic cross-sectional view of a further exemplary configuration for loading a multi-region structure with non-polar liquid.

The multi-region structure 78 is lowered into the container 90 through the layer of non-polar liquid 86 floating on top of the higher density liquid 88. The container 90 has a first valve 92 that connects the container 90 to a storage module 96. The storage module 96 has a second valve 94 and a door 102. The storage module 96 may also contain a rack 98 having locators 100.

With first valve 92 and second valve 94 open, the multi-region structure 78 may, after being lowered through the layer of non-polar liquid 86, be lowered onto rack 98 and be supported by one of the locators 100. The rack 98 may then be moved horizontally, and another multi-region structure 78 lower through the layer of non-polar liquid 86 and into the next locator 100 on the rack 98.

When rack 98 is fully loaded with multi-region structures 78, each having all the hydrophobic regions 84 loaded with the same amount of non-polar liquid 86, the first valve 92 and the second valve 94 may be closed. The storage module 96 may then be turned over so that door 102 may be opened without spilling the higher density liquid 88 contained in the storage module 96. The rack 98 may then be removed so that the multi-region structures 78 may move on to the next stage in manufacturing a display.

Figure 15:
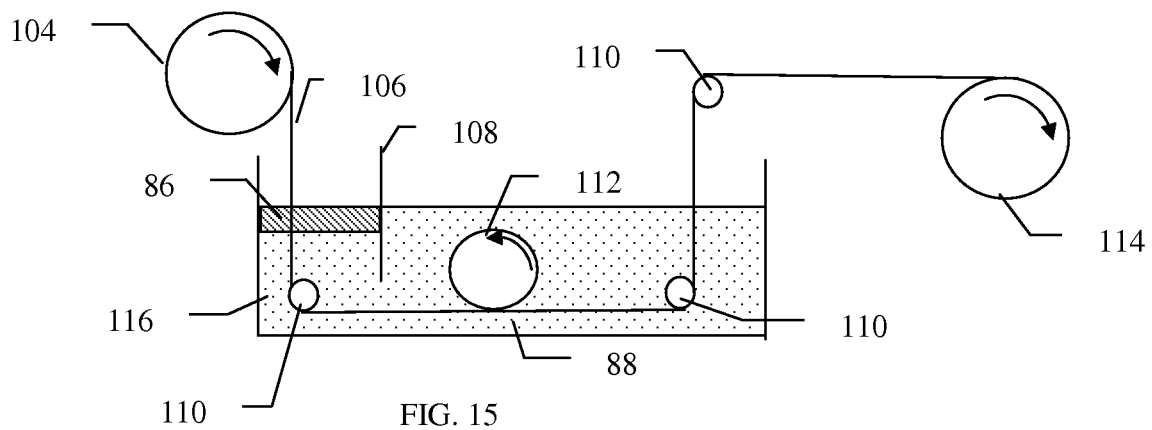
FIG. 15 shows a schematic cross-sectional view of an exemplary configuration for loading a roll of multi-region structure with non-polar liquid.

FIG. 15 shows a schematic cross-sectional view of an exemplary configuration for loading a roll of multi-region structure with non-polar liquid.

A first reel 104 contains a flexible, multi-region material 106. The flexible, multi-region material 106 may, for instance, be a polymer sheet having coatings to make it suitable for use as the support layer in an electrowetting picture display. Such coatings may, for instance, include a transparent electrode layer and a hydrophobic surface layer as well as a hydrophilic well structure for defining the extent of individual picture elements. The flexible, multi-region material 106 is feed from the first reel 104 through a layer of non-polar liquid 86 floating on a higher density liquid 88 contained in a container 116. The layer of non-polar liquid 86 may be contained to a portion of the container 116 by a retaining wall 108.

By feeding the flexible, multi-region material 106 through the layer of non-polar liquid 86 at a consistent, uniform rate, each of the hydrophobic regions 84, that may each be picture elements, may be loaded with a uniform amount of non-polar liquid 86.

The flexible, multi-region material 106 may then be fed by guiding rollers 110 onto a take up reel 114.

There may also be an additional reel 112 that may, for instance contain a flexible material suitable for the top layer of an electrowetting display. The additional reel 112 may be used to complete the next step in manufacturing the display by adding the top layer of the display. In that way, the material collected on take up reel 114 may be a completed, flexible display having both a front and back support as well as being filled with the appropriate amounts of the non-polar liquid 86 and the higher density liquid 88.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

What is claimed is:

1. A bistable, electrowetting picture element, comprising:
a first fluid and a second fluid, immiscible with each other, within a space between a first substantially flat electrowetable surface and a second substantially flat electrowetable surface;
said first fluid containing a pigment and being light absorbing;
said second fluid being electroconductive or polar;
said bistable electro-wetting picture element being switchable between a stable "OFF" state, said stable "OFF" state being maintained with no voltage being applied to, and no power being consumed by, said bistable element and a stable "ON" state, said stable "ON" state being maintained with no voltage being applied to, and no power being consumed by, said bistable electro-wetting picture element, and in which in said "OFF" state said first fluid adjoins a first region of said first surface and a light beam directed normal to, and toward, said second surface is substantially absorbed by said first fluid, while in said "ON" state said first fluid adjoins a second region of said second surface, and wherein said first region differs in area from said second region such that in said second state a majority of said light beam directed normal to, and towards, said second surface passes through said picture element; and
wherein said "OFF" state is switched to said "ON" state by applying a transient voltage between a first electrode and a common electrode when said element is in said "OFF" state, and said "ON" state is switched to said "OFF" state by applying a transient voltage between a second electrode and a common electrode when said element is in said "ON" state.

2. The device of claim 1 wherein said second surface comprises a wall dividing said second surface into at least two sub-picture regions, and wherein said second region comprises one of said sub-picture regions.

3. The device of claim 2 wherein said at least two sub-picture regions have substantially equal areas.

4. The device of claim 1 wherein said second fluid is confined to the space of the picture element.

5. The device of claim 1 further comprising a device comprising a multiplicity of said pixel elements and wherein said second fluid forms a layer common to several of said picture elements.

6. The device of claim 5 wherein picture elements have picture element walls extending over a height less than a height of the space between said first surface and said second surface.

7. The device of claim 1 further comprising an absorber of a reflector configured to absorb or reflect light incident on said display device.

8. The device of claim 7 wherein said reflector is diffusive.

9. The device of claim 1 further comprising a color filter.

10. The device of claim 1 wherein said first fluid is reflective.

11. The device of claim 1 wherein said first fluid is light absorbing.

12. The device of claim 11 wherein said first fluid comprises a suitable pigment.

13. A bistable, electrowetting display method, comprising:
    providing a picture element comprising a first fluid and a second fluid, immiscible with each other, within a space between a first substantially flat electro-wetable surface and a second substantially flat electro-wetable surface;
    said first fluid containing a pigment and being light absorbing;
    said second fluid being electroconductive or polar;
    said bistable electro-wetting picture element being switchable between stable "OFF" state, said stable "OFF" state being maintained with no voltage being applied to, and no power being consumed by, said bistable element and a stable "ON" state, said stable "ON" state being maintained with no voltage being applied to, and no power being consumed by, said bistable electro-wetting picture element, and in which in said "OFF" state said first fluid adjoins a first region of said first surface and a light beam directed normal to, and toward, said second surface is substantially absorbed by said first fluid, while in said "ON" state said first fluid adjoins a second region of said second surface, and wherein said first region differs in area from said second region such that in said second state a majority of said light beam directed normal to, and towards, said second surface passes through said picture element; and
    wherein said "OFF" state is switched to said "ON" state by applying a transient voltage between a first electrode and a common electrode when said element is in said "OFF" state, and said "ON" state is switched to said "OFF" state by applying a transient voltage between a second electrode and a common electrode when said element is in said "ON" state.

14. The method of claim 13 comprises providing a wall dividing said second surface into at least two sub-picture regions, and wherein said second region comprises one of said sub-picture regions.

* * * * *